United States Patent
Spittle et al.

(10) Patent No.: US 11,771,021 B2
(45) Date of Patent: Oct. 3, 2023

(54) NATURALLY DYED MULCH AND GROWING MEDIA

(71) Applicant: PROFILE PRODUCTS, L.L.C., Buffalo Grove, IL (US)

(72) Inventors: Kevin Scott Spittle, Vero Beach, FL (US); Gary Lane Bowers, Jonesborough, TN (US)

(73) Assignee: PROFILE PRODUCTS L.L.C., Buffalo Grove, IL (US)

( * ) Notice: Subject to any disclaimer, the term of this patent is extended or adjusted under 35 U.S.C. 154(b) by 0 days.

(21) Appl. No.: 17/088,633

(22) Filed: Nov. 4, 2020

(65) Prior Publication Data
US 2021/0047566 A1 Feb. 18, 2021

Related U.S. Application Data

(63) Continuation of application No. 15/322,899, filed as application No. PCT/US2015/038315 on Jun. 29, 2015, now Pat. No. 10,889,758.
(Continued)

(51) Int. Cl.
*A01G 13/02* (2006.01)
*A01G 24/23* (2018.01)
*C09K 17/52* (2006.01)

(52) U.S. Cl.
CPC ............... *A01G 24/23* (2018.02); *C09K 17/52* (2013.01)

(58) Field of Classification Search
CPC ........ A01G 24/00; A01G 24/20; A01G 24/22; A01G 24/23; A01G 13/0262; A01G 13/0281; C09K 17/52
See application file for complete search history.

(56) References Cited

U.S. PATENT DOCUMENTS

| 441,760 A | 12/1890 | Horrocks |
| 524,650 A | 8/1894 | Potter |

(Continued)

FOREIGN PATENT DOCUMENTS

| CN | 103270927 A | 9/2013 |
| CN | 103340139 A | 10/2013 |

(Continued)

OTHER PUBLICATIONS

Chinese Office Action dated Mar. 29, 2021 for CN Application No. 201580035717.2, received in a related application. An English Translation is provided.
(Continued)

*Primary Examiner* — Kristen C Hayes
(74) *Attorney, Agent, or Firm* — BROOKS KUSHMAN P.C.

(57) ABSTRACT

A method for making a dyed mulch composition or a dyed growing medium, the method comprising combining tree bark including one or more pigments and/or pigment precursors and wood components together to form an initial composition; heating the initial composition at a temperature greater than about 149° C. under steam in a pressurized vessel; processing the initial composition through a refiner with a plurality of opposing disks, the refiner separating the tree bark and wood components into fibers and separating the fibers from each other; and dyeing the wood components by the one or more pigments and/or pigment precursors while the tree bark and the wood components are being separated into fibers in the refiner to obtain dyed fibers.

20 Claims, 2 Drawing Sheets

Related U.S. Application Data

(60) Provisional application No. 62/123,782, filed on Nov. 26, 2014, provisional application No. 62/018,639, filed on Jun. 29, 2014.

(56) References Cited

U.S. PATENT DOCUMENTS

| | | |
|---|---|---|
| 524,695 A | 8/1894 | Potter |
| 1,015,764 A | 1/1912 | Potter |
| 1,222,523 A | 4/1917 | Cary |
| 1,331,001 A | 2/1920 | Conrad |
| 1,610,096 A | 12/1926 | Jolly |
| 1,610,791 A | 12/1926 | Jolly |
| 1,629,068 A | 5/1927 | Cook |
| 1,700,321 A | 1/1929 | Lauterbur |
| 1,700,621 A | 1/1929 | Allen |
| 2,100,300 A | 11/1937 | Mitchell |
| 2,157,684 A | 5/1939 | Williams et al. |
| 2,744,045 A | 5/1956 | Collins |
| 2,757,150 A | 7/1956 | Heritage |
| 2,759,224 A | 8/1956 | Simons |
| 2,795,080 A | 6/1957 | Williams |
| 2,893,064 A | 7/1959 | Rusca et al. |
| 2,902,722 A | 9/1959 | Wallace |
| 2,986,778 A | 6/1961 | Goodwin et al. |
| 2,989,252 A | 6/1961 | Babb |
| 2,995,434 A | 8/1961 | Burton |
| 3,051,398 A | 8/1962 | Babb |
| 3,139,650 A | 7/1964 | Diesel |
| 3,150,215 A | 9/1964 | Houghton |
| 3,192,571 A | 7/1965 | Halleux |
| 3,208,107 A | 9/1965 | Kotter et al. |
| 3,251,096 A | 5/1966 | Rapp |
| 3,797,073 A | 3/1974 | Fairfield |
| 3,862,472 A | 1/1975 | Norton et al. |
| 4,031,003 A | 6/1977 | Husky |
| 4,057,876 A | 11/1977 | Sawyer |
| 4,097,209 A | 6/1978 | Garrick et al. |
| 4,109,875 A | 8/1978 | Condarco et al. |
| 4,192,042 A | 3/1980 | Jagst |
| 4,202,079 A | 5/1980 | Prather |
| 4,237,814 A | 12/1980 | Ormos et al. |
| 4,274,177 A | 6/1981 | Grimshaw et al. |
| 4,300,267 A | 11/1981 | Winch et al. |
| 4,435,353 A | 3/1984 | Forry et al. |
| 4,458,381 A | 7/1984 | Van Doorn et al. |
| 4,479,285 A | 10/1984 | Ragan |
| 4,548,131 A | 10/1985 | Williams |
| 4,625,368 A | 12/1986 | Leifeld |
| 4,662,031 A | 5/1987 | Feiks et al. |
| 4,723,343 A | 2/1988 | Bernhardt et al. |
| 4,756,059 A | 7/1988 | Temburg |
| 4,766,648 A | 8/1988 | Kerley |
| 4,788,790 A * | 12/1988 | Zeager ............... C09K 17/52 47/9 |
| 4,796,335 A | 1/1989 | Kranefeld et al. |
| 4,932,156 A | 6/1990 | Underwood |
| 4,971,540 A | 11/1990 | Barnes |
| 4,987,646 A | 1/1991 | Leifeld et al. |
| 4,993,119 A | 2/1991 | Roberson |
| 5,087,400 A | 2/1992 | Theuveny |
| 5,121,841 A | 6/1992 | Harrington et al. |
| 5,192,587 A * | 3/1993 | Rondy ................... B05D 1/18 118/417 |
| 5,343,597 A | 9/1994 | Pinto et al. |
| 5,513,805 A | 5/1996 | Fisher et al. |
| 5,537,809 A | 7/1996 | Blalock |
| 5,617,614 A | 4/1997 | Locatelli et al. |
| 5,845,367 A | 12/1998 | Vezzoli et al. |
| 6,195,841 B1 | 3/2001 | Mascheretti et al. |
| 6,327,745 B1 | 12/2001 | Franke |
| 6,349,499 B1 | 2/2002 | Spittle |
| 6,393,665 B1 | 5/2002 | Foster et al. |
| 6,435,433 B1 | 8/2002 | Hesch |
| 6,442,803 B1 | 9/2002 | Foster et al. |
| 6,460,223 B1 | 10/2002 | Pinto |
| 6,539,585 B1 | 4/2003 | Anthony |
| 6,615,454 B1 | 9/2003 | Anthony |
| 6,711,850 B2 | 3/2004 | Yelanich et al. |
| 6,740,342 B1 | 5/2004 | Hulst et al. |
| 6,773,545 B2 | 8/2004 | Tanner et al. |
| 6,786,438 B2 | 9/2004 | Winn |
| 6,800,319 B1 | 10/2004 | Hulst et al. |
| 7,032,273 B2 | 4/2006 | Pinto |
| 7,752,715 B2 | 7/2010 | Morgner et al. |
| 7,797,798 B2 | 9/2010 | Rosemann |
| 8,567,117 B2 * | 10/2013 | Spittle ............... A01G 13/0268 47/9 |
| 8,894,811 B1 | 11/2014 | Brown |
| 8,984,805 B2 | 3/2015 | Shpak et al. |
| 10,266,457 B2 * | 4/2019 | Spittle ................ C05G 3/04 |
| 10,519,073 B2 | 12/2019 | Spittle et al. |
| 10,519,373 B2 | 12/2019 | Spittle et al. |
| 10,907,098 B2 | 2/2021 | Spittle et al. |
| 11,434,425 B2 | 9/2022 | Spittle et al. |
| 2002/0026688 A1 | 3/2002 | Rubenach |
| 2002/0189053 A1 | 12/2002 | Pasini et al. |
| 2003/0056873 A1 | 3/2003 | Nakos et al. |
| 2005/0076564 A1 | 4/2005 | Castleberry |
| 2006/0112629 A1 * | 6/2006 | Wright ............... A01G 24/23 47/9 |
| 2006/0150495 A1 * | 7/2006 | MacConnell ......... A01G 24/15 47/59 S |
| 2006/0207064 A1 | 9/2006 | Minter |
| 2007/0186463 A1 | 8/2007 | Lougheed |
| 2008/0280760 A1 | 11/2008 | Oliver |
| 2009/0101294 A1 | 4/2009 | Young |
| 2010/0155513 A1 | 6/2010 | Brick et al. |
| 2012/0255143 A1 | 10/2012 | Iten et al. |
| 2013/0075504 A1 | 3/2013 | Beaudet et al. |
| 2013/0075509 A1 | 3/2013 | Beaudet et al. |
| 2013/0255048 A1 | 10/2013 | Crary et al. |
| 2015/0225304 A1 | 8/2015 | Donze et al. |
| 2015/0368165 A1 | 12/2015 | Tournayre et al. |
| 2016/0083651 A1 | 3/2016 | Phillips et al. |
| 2016/0138201 A1 | 5/2016 | Bocht |
| 2017/0114276 A1 * | 4/2017 | Spittle ................ C05G 3/04 |
| 2017/0305802 A1 | 10/2017 | Tournayre et al. |
| 2018/0057966 A1 | 3/2018 | Spittle et al. |
| 2020/0299208 A1 | 9/2020 | Norden et al. |

FOREIGN PATENT DOCUMENTS

| | | |
|---|---|---|
| EP | 0104355 A1 | 4/1984 |
| EP | 0167340 A2 | 1/1986 |
| JP | 61186524 A | 8/1986 |
| JP | 2006214053 A | 8/2006 |
| KR | 19810001716 B1 | 11/1981 |
| TW | 200738849 A | 10/2007 |

OTHER PUBLICATIONS

Canadian Office Action dated Aug. 25, 2021 for Canadian Application No. CA 2,953,521, received in a related application.

Non-Final Office Action dated Apr. 26, 2021 for U.S. Appl. No. 15/322,921, received in a related application.

1st Chinese Office Action dated Dec. 14, 2021 for Chinese Application No. 201880006226.9 issued in a related application. English Translation included.

Canadian Office Action dated Jul. 9, 2021 for CA Application No. 2,953,717, received in a related application.

Final Office Action dated Aug. 30, 2021 for U.S. Appl. No. 15/792,100, received in a related application.

Korean Office Action dated Sep. 29, 2021 for KR Application No. 10-2017-7002508 issued in a related application. English Translation included.

Notice of Allowance dated Oct. 25, 2021 received in related application U.S. Appl. No. 15/322,921.

Non-Final Office Action dated Oct. 14, 2021 received in related application U.S. Appl. No. 17/071,602.

(56) References Cited

OTHER PUBLICATIONS

Australian Examination Report No. 1 dated Nov. 26, 2021 that issued in connection with related Australian Patenl Application No. 2020267281.
Non-Final Office Action dated Feb. 24, 2021 for U.S. Appl. No. 15/792,100, received in a related application.
European Office Action dated May 18, 2021 for EP Application No. 15815634.9 , received in a related application.
European Office Action dated Mar. 22, 2021 for EP Application No. EP 501B0002EP, received in a related application.
Notice of Allowance dated May 18, 2022 for U.S. Appl. No. 17/071,602, received in a related application.
Australian Examination Report No. 1 dated Apr. 5, 2022 for Australian Appln. No. 2018205254, received in related application.
Korean 1st Office Action dated Mar. 28, 2022 for Korean Appln. No. 10-2017-7002294, received in related application.
U.S. Non-Final Office Action dated Mar. 15, 2022 for U.S. Appl. No. 15/792,100, received in related application.
Fifth Chinese Office Action dated Jul. 30, 2021 for Chinese Application No. CN 2015800357172, received in a related application. English Translation of Chinese OA is provided.
3rd Party Submission Notice dated Jun. 23, 2021 submitted by Tony Jennings in connection with related Australian Patent Application No. 2020267281. 14 pages.
YouTube video clip entitled "High-Quality Substrates for Professional Horticulture," https://youtu.be/UcDo5fS8Awo, Pindstrup Production Video, uploaded on Nov. 28, 2019, 35 pages.
Pindstrup, "Projects", https://www.pindstrup.com/about/projects, Sep. 15, 2015, 4 pages.
First Australian Office Action dated Feb. 3, 2021 for AU Application No. 2020201215, received in a related application.
2nd Chinese Office Action dated Aug. 11, 2022 for CN Application No. 201880006226.9, issued in a related application.
1st Korean Office Action dated Sep. 7, 2022 for KR Application No. 10-2019-7022657, issued in a related application.
Zhang Yuanguo, "Vegetable Intensive Seedling Technology," Golden Shield Press, (cited in Chinese OA Aug. 11, 2022 for CN Application No. 201880006226.9) in related application.
International Search Report dated Jan. 13, 2023 for related application EP Application No. 22204039.6.
International Search Report dated Mar. 20, 2023 for related application EP Application No. 22213701.0.
Chinese Office Action dated Feb. 2, 2023, for related CN Application No. 201880006226.9. Machine Translation provided.
Notice of Allowance dated Sep. 27, 2022 received in related application U.S. Appl. No. 15/792,100.
Chinese Office Action dated Apr. 18, 2023, for related ON Application No. 201580036062.0. Machine Translation provided.
2nd Canadian Office Action dated May 26, 2022 for CA Application No. 2,953,621, issued in a related application.
European Office Action dated Apr. 17, 2023, for related EP Application No. 15 815 634.9.
U.S. Non-Final Office Action dated Jul. 17, 2023, issued in related U.S. Appl. No. 17/666,060.
Korean Office Action dated Jul. 1, 2023, for related KR Application No. 10-2022-7042522.
U.S. Non-Final Office Action dated Aug. 8, 2023, issued in related U.S. Appl. No. 17/865,911.

\* cited by examiner

NATURALLY DYED MULCH AND GROWING MEDIA

CROSS-REFERENCE TO RELATED APPLICATIONS

This application is a Continuation of U.S. application Ser. No. 15/322,899, filed Dec. 29, 2016 now U.S. Pat. No. 10,889,758, issued Jan. 12, 2021, which is the U.S. National Phase of PCT Appln. No. PCT/US2015/038315 filed Jun. 29, 2015 (expired), which claims the benefit of U.S. provisional Application No. 62/018,639 filed Jun. 29, 2014 and the benefit of U.S. provisional Application No. 62/123,782 filed Nov. 26, 2014, the disclosures of which are incorporated in their entirety by reference herein.

TECHNICAL FIELD

The present invention is related to the natural coloring of a hydraulically applied mulch composition used in hydroseeding for seed establishment as well as erosion control and of a substrate that can be used as a replacement of peat in a growing medium.

BACKGROUND

A variety of issues stemming from use of dyestuffs are arising worldwide as dyestuffs are detrimental to the environment when land-applied. For example, malachite green, a triarylmethane dye, has been banned in Europe for use on land-applied products due to toxicological effects on fish and mammals. Malachite green remains to be the most popular dyestuff used in the United States for dyeing hydraulically-applied mulches although it has been banned in Minnesota for use as a marker dye in mulches. Moreover, hydraulic mulches produced from direct or acid dyes have minimal light fastness—about 2 to about 5 days, depending upon exposure to direct sunlight which may be insufficient in a variety of applications.

Accordingly, there is a need to develop alternative dyes for hydraulically-applied mulches and growing media that are environmentally safe and have improved light-fastness for land applications.

SUMMARY

The present invention solves one or more problems of the prior art by providing a method for making a naturally colored growing medium or a mulch composition. The method includes a step of combining tree bark and wood components to form an initial composition. The initial composition is heated to a temperature greater than about 300° F. (about 149° C.) under steam in a pressurized vessel and processed through a refiner containing a plurality of opposing disks, the refiner separating the tree bark and wood components into fibers and separating the fibers from each other, and dyeing the wood components by the one or more pigments and/or pigment precursors while the tree bark and the wood components are being separated into fibers in the refiner to obtain dyed fibers. The resulting dyed wood fiber is useful for visual monitoring, does not contain any environmentally unsafe dyes, and may be applied as hydraulic mulch or hydraulically applied growing medium. Advantageously, the dyed wood fiber possesses a light-fastness of at least up to three months with minimal fading.

DETAILED DESCRIPTION

Figure 1:
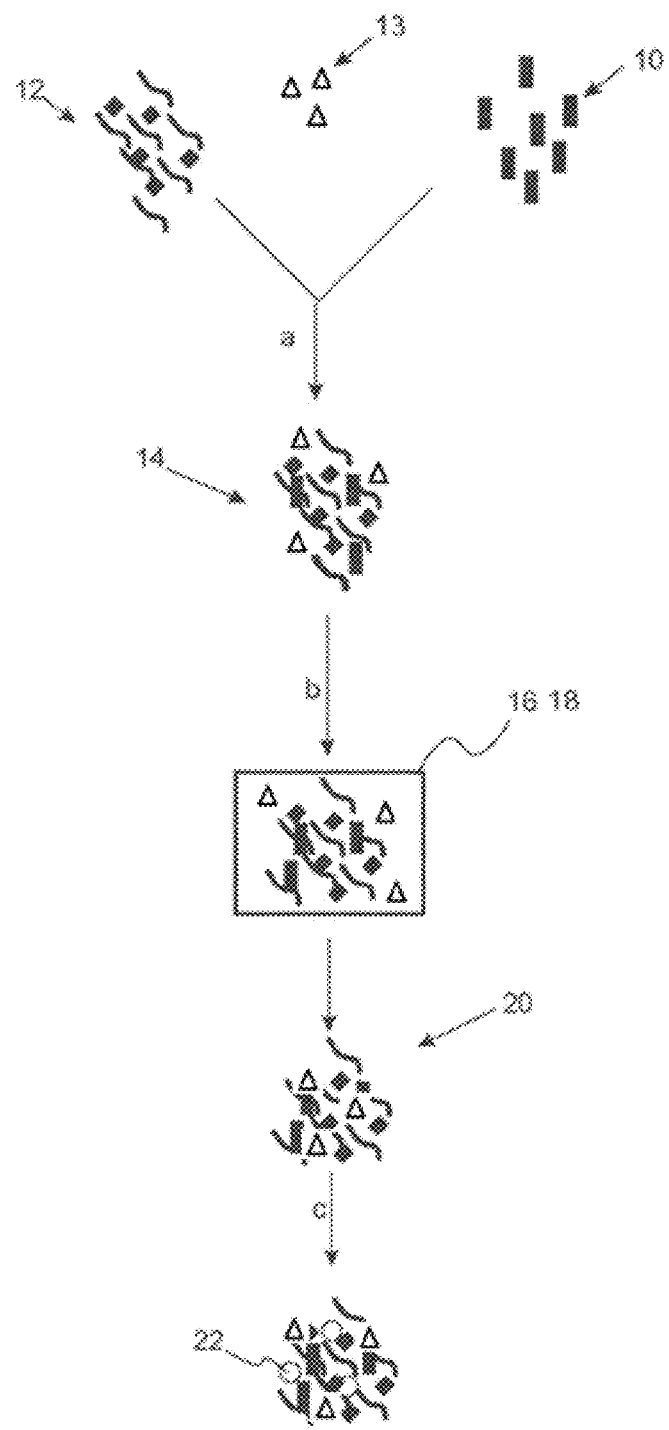
FIG. 1 is a schematic flowchart illustrating formation of a dyed mulch composition or a dyed growing medium.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "light-fastness" as used herein refers to the resistance of a pigment to color change upon exposure to light. Light-fastness can be determined according to the methods of ASTM D4303-99.

The term "dominant wavelength" refers to a way of describing polychromatic light mixtures in terms of monochromatic light that evokes an identical perception of hue. It is determined on the International Commission on Illumination (CIE)'s color coordinate space by a straight line between the color coordinates for the color of interest and the coordinates for the illuminate. The intersection at the perimeter of the coordinate space nearest the color of interest is the dominant wavelength.

The term "mulch" as used herein means a layer of fibrous material that is applied to a soil to reduce erosion, to improve water retention, and/or to hold a seed in place on the soil surface long enough for the seed to germinate and for the root to develop within the soil below the mulch. Hydraulic mulches are mulches applied by spraying with water through a hydraulic seeder or similar device.

The term "growing medium" refers to a soil-free substrate or a substrate with soil, or a combination of materials used to provide physical support, water retention, aeration, and/or nutrient supply for plant growth so that a plant can establish its root system within the growing medium and allow for root growth, as the roots grow in spaces between individual particles of the growing medium.

The term "bark" refers to a plurality of stem tissues including one or more of cork (phellum), cork cambium (phellogen), phelloderm, cortex, phloem, vascular cambium, and xylem. Examples of useful tree barks include, but are not limited to, bark from pine, oak, walnut (*Juglans cinerea*), mahogany *Swietenia macrophylla, Swietenia mahagoni, Swietenia humilis*), hemlock, Douglas fir, Colorado fir, alder, elm, birch, Sitka spruce, eucalyptus, sycamore, maple, cedar, sweetgum, crab apple, ash, weeping willow, sassafras, mulberry, and the like, and combinations thereof. Pine tree bark is found to be particularly useful in the hydraulic mulch composition.

The mulch composition or growing medium includes wood components. Typically, the wood components are lighter in color than the tree bark before processing. The wood components include one or more components selected from the group consisting of wood fibers, wood chips, other wood components, and combinations thereof. The wood components are dyed by the tree bark when the wood components are being formed into fibers through the refiner such that the resulting mulch composition or a growing medium has a natural brown coloring for visual monitoring.

The tree bark may contain one or more pigments or pigment precursors that give color to its layers. Some bark (for example eucalyptus bark and sycamore bark) may be light-colored initially, but darken after its pigments are oxidized. Pigments included in the bark may include, but are not limited to, tannins such as tannic acid (e.g., quercitannic acid and gallotanic acid). Non-limiting examples of useful tree barks containing one or more pigments are named above. In addition, during heat treatment, additional pigments may develop in the bark, in the wood, or both, which contribute to the color of the mulch product or the growing medium. This is what is meant by "pigment precursors."

The amount, age, moisture, and/or other properties of the bark used may influence hue and/or intensity of the imparted color. For example, low quantities of bark may result in light brown color of the mulch composition or growing medium while high quantities of bark may result in dark brown color. At least about 1 weight %, about 3 weight %, preferably about 5 weight % of bark may be needed to obtain mulch or growing medium dyed by the bark pigments. To color-change the mulch or growing medium, about 1 to about 99 weight % of bark may be included in the initial composition, based on the total weight of the initial composition. Additional bark may be added during the process of producing mulch or growing medium so that the final color of the fiber product may be adjusted to the desired hue. Concerning the age of bark, the bark from the most recently debarked trees generally provides for the most intense color change of the wood components. Moisture of the bark may be about 30 to 60%, measured by ASTM D4442-07, to provide adequate color change of the wood components.

The mulch composition or growing medium may have a color with a dominant wavelength from about 510 nm to about 780 nm, about 590 nm to about 770 nm, about 620 nm to about 760 nm, or about 675 nm to about 750 nm relative to a white illuminate. The mulch composition or growing medium may have a red to brown to black color. The mulch composition or growing medium may have a yellow, orange, gray, or green color. The mulch composition or growing medium may have hsl color coordinates such that the "h value" (hue) is from about 25 to about 45, the "s value" (saturation) is from about 20 to about 100, and the "l value" (lightness) is less than about 50. The l value may be from about 0 to about 25.

The mulch composition or growing medium may further include a non-permanent dye that is eventually removed or that eventually fades after the composition is applied. Preferably, the non-permanent dye is non-toxic so that no toxic chemicals are leached from the mulch composition or growing medium into the environment. The non-permanent dye may comprise natural and/or synthetic compounds. The non-permanent dye may comprise compounds derived from plants, fungi, lichens, invertebrates, insects, minerals, the like, or a combination thereof. Any part of the plant may be utilized to provide the dye such as roots, petals, leaves, stems, shoots, stalks, hulls, husks, ripe and/or unripe fruit, or seed. Exemplary sources of plant dyestuffs include tree varieties named above; vegetables such as carrots, beetroot, red cabbage, artichoke, spinach, celery; fruit such as blueberries, pomegranate, strawberries, avocado, cherries, raspberries, mulberries, elderberries, blackberries, grapes, peach; turmeric, fennel, basil, paprika, saffron, tea plants, coffee plants, barberry, bloodroot, lilac, coneflower, dandelion, goldenrod, hollyhock, ivy, St John's Wort, yellow dock, rose, lavender, cornflower, hyacinth, Queen Anne's Lace, hibiscus, daylily, safflower, camellia, snapdragon, nettle, milkweed, peony, Black-eyed Susan, hydrangea, chamomile, alfalfa, crocus, marigold, or the like. Exemplary mineral-based dyestuffs include iron oxide and carbon black. Exemplary useful non-permanent dye includes ELCOMENT BLACK 7822 commercially available from Greenville Colorants. Another exemplary type of non-permanent dye may include green pigments.

The non-permanent dye may be combined with the bark alone and/or with the components alone before step a), with the initial composition in step a), with the mulch composition or growing medium in step b), in step c), after step c), or in more than one step. At least about 0.1 to about 2 weight % of non-permanent dye may be added to the initial composition to cause color change of the wood fiber, based on the total weight of the initial composition. About 0.1 to 15 weight % or more, about 2 to 10 weight %, about 3 to 7 weight % of the non-permanent dye may be added to the initial composition, based on the total weight of the initial composition. At least about 2-40 pounds of non-permanent dye may be added per ton of the final mulch or growing medium to achieve color change.

Figure 2A:
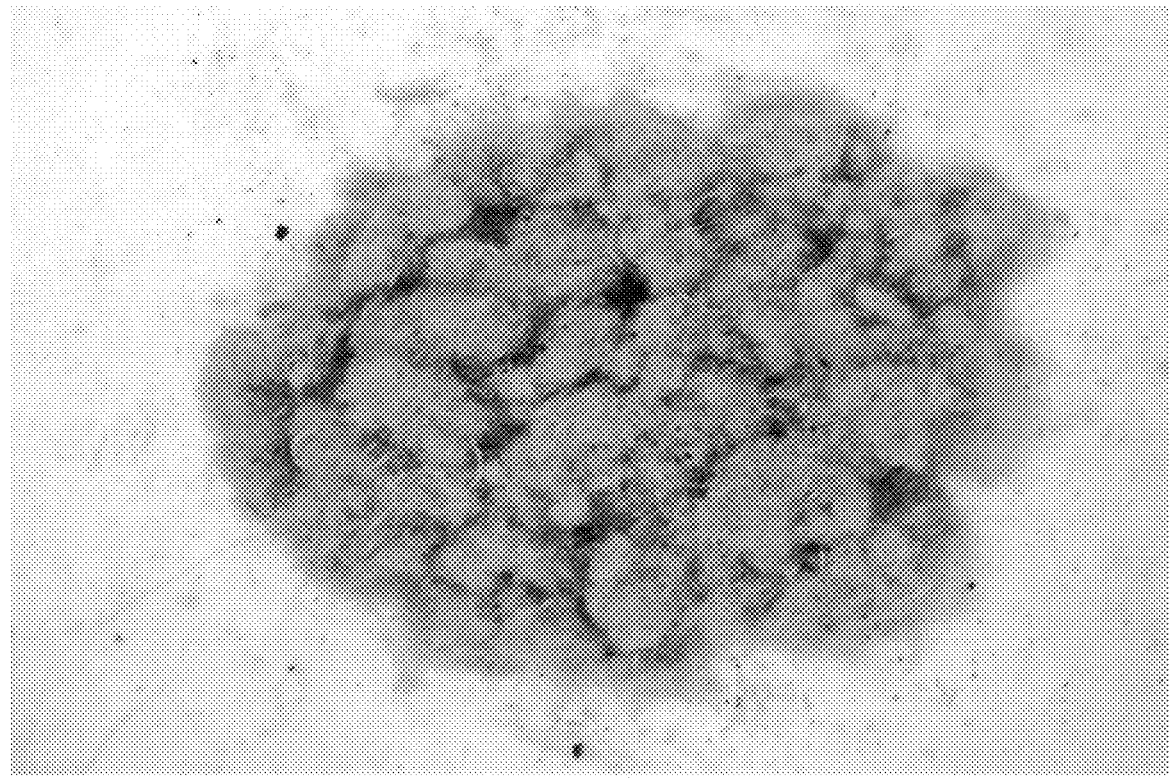
FIG. 2A is a photograph of a hydraulic mulch composition without a non-permanent dye.
Figure 2B:
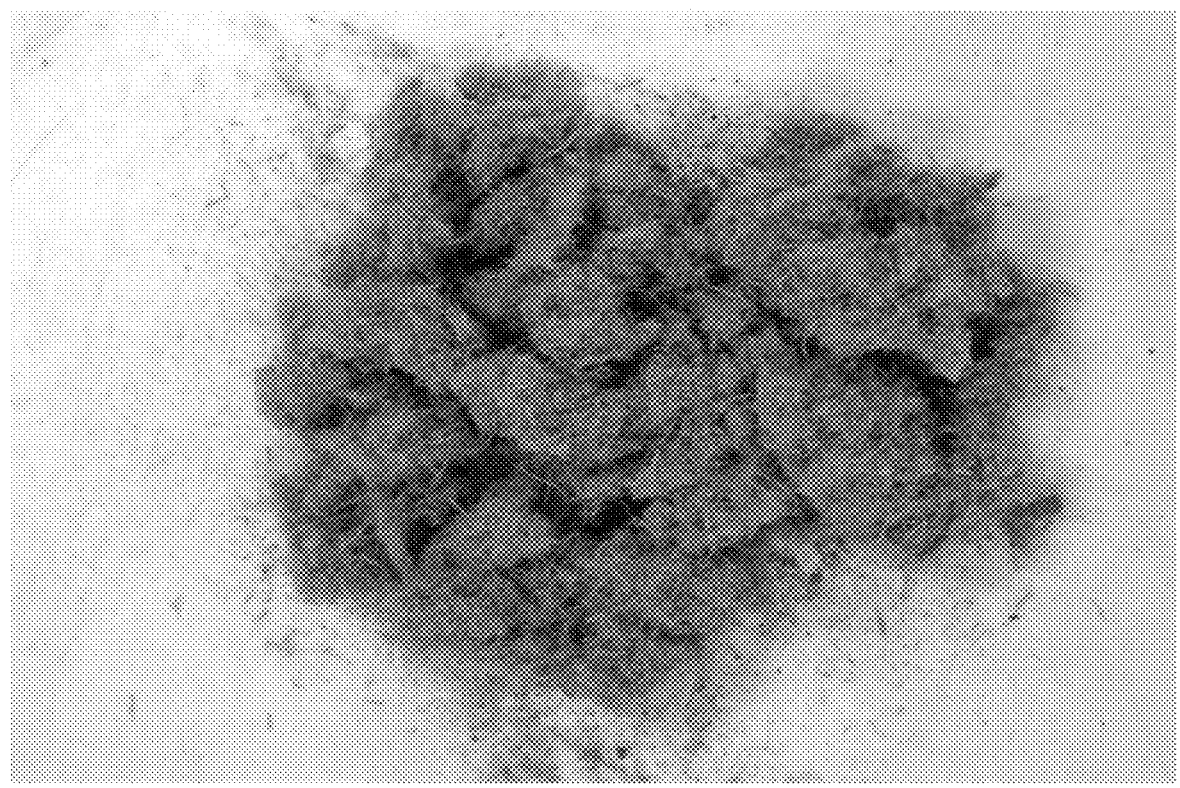
FIG. 2B is a photograph of a hydraulic mulch composition comprising a non-permanent dye.

Typically, the removable non-permanent dye imparts a darker color on the mulch composition or growing medium than when the non-permanent dye is absent therein, as is illustrated in FIGS. 2A and 2B. FIG. 2A depicts a hydraulic mulch composition without the non-permanent dye, wherein the mulch composition is dyed with pigments in the bark, in the wood, or in both, which contribute to the light brown or khaki color of the mulch product. FIG. 2B depicts a mulch composition including the natural removable non-permanent dye which imparts dark brown color to the composition. The non-permanent dye may be washed away after several days (about 1 to about 30 days or after more extensive time period) after being applied in the field. The non-permanent dye may fade away or begin to fade away (e.g., from exposure to sunlight or other environmental conditions) after several days such as about 1 to about 30 days or after more extensive time period after being applied in the field.

The mulch composition or growing medium with the non-permanent dye may have a color with a dominant wavelength from about 400 nm to about 780 nm, about 510 nm to about 770 nm, about 590 nm to about 760 nm, or about 620 nm to about 750 nm relative to a white illuminate. The color of the mulch composition or growing medium including the non-permanent dye may vary. The fiber-containing product with the non-permanent dye may have a red to brown to black color. But other colors such as green, blue, yellow, orange, purple, or gray hues are contemplated as well. The type and amount of dye determine intensity of the color. Typically, the removable non-permanent dye imparts a darker color on the fiber-containing product than when the non-permanent dye is absent therefrom. Alternatively, the fiber-containing product with the non-permanent dye may have a lighter color than when the non-permanent dye is absent therefrom. The fiber-containing product may have a lower "h value" than the fiber-containing product without the non-permanent dye. The mulch composition or growing medium may have hsl color coordinates such that the "h value" (hue) is from about 10 to about 40, the "s value" (saturation) is from about 20 to about 100, and the "l value" (lightness) is less than about 50. The l value may be from about 0 to about 25.

The mulch or growing medium may be dyed by bark pigments and/or by one or more natural non-permanent dyes in order to comply with organic standards and secure a certificate from the Organic Materials Review Institute (OMRI).

A mulch composition or a growing medium including about 1 to about 50% of tree bark may be mixed with about 99 to about 50 weight % of processed wood components, based on the total weight of the growing medium. A mulch composition or a growing medium may include about 50 to about 95% of tree bark mixed with about 50 to about 5 weight % of processed wood components, based on the total weight of the growing medium. Alternatively, the mulch composition or growing medium may include about 5 to about 30 weight % of tree bark mixed with about 95 to about 70 weight % of wood components, based on the total weight of the growing medium. The mulch composition or growing medium may include about 5 to about 20 weight % of tree bark and about 95 to about 80 weight % of wood components, based on the total weight of the growing medium. Alternatively still, the mulch composition growing medium may include about 5 to about 15 weight % of tree bark and about 95 to about 85 weight % of wood components, based on the total weight of the growing medium.

The mulch composition or growing medium may further include about 0 to about 15 weight % of additional components, based on the total weight of the growing medium, that are combined with the dyed wood fiber. Examples of such additional components include but are not limited to, fertilizers, macronutrients, micronutrients, minerals, chemical binders, natural gums, interlocking manmade fibers, and the like, and combinations thereof. In general, these additional nutritional components may be present in an amount of less than about 15 weight % of the total weight of the mulch composition or growing medium. The additional components in total may be present in an amount from about 1 to about 10% of the total weight of the mulch composition or growing medium. Additionally, soil may be added in an amount of about 20% or less, about 15% or less, or about 5% or less of the total weight of the mulch composition or the growing medium. The soil may be present in an amount of about 0.1 to about 20 weight % of the total weight of the growing medium. Soil may also be absent from the growing medium.

Fertilizers such as nitrogen fertilizers, phosphate fertilizers, potassium fertilizers, compound fertilizers, and the like may be used in a form of granules, powder, prills, or the like. For example, melamine/formaldehyde, urea/formaldehyde, urea/melamine/formaldehyde and like condensates may serve as a slow-release nitrogenous fertilizer. Fertilizers having lesser nutritional value, but providing other advantages such as improving aeration, water absorption, or being environmental-friendly may be used. The source of such fertilizers may be, for example, animal waste or plant waste.

Nutrients are well-known and may include, for example, macronutrients, micronutrients, and minerals. Examples of macronutrients include chloride, magnesium, phosphorus, potassium, and sodium. Micronutrients are also well-known and include, for example, boron, cobalt, chromium, calcium, copper, fluoride, iodine, iron, magnesium, manganese, molybdenum, selenium, zinc, vitamins, organic acids, and phytochemicals.

The binders may be natural or synthetic. For example, the synthetic binders may include a variety of polymers such as addition polymers produced by emulsion polymerization and used in the form of aqueous dispersions or as spray dried powders. Examples include styrene-butadiene polymers, styrene-acrylate polymers, polyvinylacetate polymers, polyvinylacetate-ethylene (EVA) polymers, polyvinylalcohol polymers, polyacrylate polymers, polyacrylic acid polymers, polyacrylamide polymers and their anionic- and cationic-modified copolymers, i.e., polyacrylamide-acrylic acid copolymers, and the like. Powdered polyethylene and polypropylene may also be used. When used, synthetic binders are preferably used in aqueous form, for example as solutions, emulsions, or dispersions. While binders are not ordinarily used in growing media, they may be useful in hydraulically applied mulches and hydraulically applied growing media.

Thermoset binders may also be used, including a wide variety of resole and novolac-type resins which are phenol/formaldehyde condensates, melamine/formaldehyde condensates, urea/formaldehyde condensates, and the like. Most of these are supplied in the form of aqueous solutions, emulsions, or dispersions, and are generally commercially available.

The natural binder may include a variety of starches such as corn starch, modified celluloses such as hydroxyalkyl celluloses and carboxyalkyl cellulose, or naturally occurring gums such as guar gum, gum tragacanth, and the like.

With reference to FIG. 1, a schematic flowchart illustrating the formation of the dyed hydraulic mulch composition or growing medium is provided. In step a), the initial composition 14 is formed by combining tree bark 10, at least some of which contains one or more pigments or pigment precursors, wood components 12, and an optional non-permanent dye 13, to form an initial composition 14. The wood components may include wood chips, wood fiber, and combinations thereof. Preferably, the wood components are wood chips. About 1 to about 50% of a tree bark may be combined with about 99 to about 50 weight % of the wood components 12, based on the total weight of the initial composition 14. Alternatively, about 5 to about 30 weight % of the tree bark 10 may be combined with about 95 to about 70 weight % of the wood components 12, based on the total weight of the initial composition 14.

In step b), the mulch composition or growing medium 20 having the dyed wood fibers is formed. The wood components 12 may be dyed by the pigments in the tree bark 10 and/or non-permanent dye 13 in step b), step c), or both. In step b), the initial composition 14 is introduced into a pressurized vessel 16 and heated to a temperature greater than about 300° F. (about 149° C.) under steam at a pressure greater than or equal to about 50 lbs/in$^2$ (about 146 kg/cm$^2$) and subsequently processed through a refiner 18 to dye the wood components 12. The initial composition 14 may be heated in a pressurized vessel 16 to an elevated temperature to kill microbes. Typically, the heating step may be conducted at a temperature in the range of about 250° F. (121° C.) or lower to about 500° F. (260° C.) or higher, about 300° F. (149° C.) to about 400° F. (204° C.), about 320° F. (160° C.) to 380° F. (about 193° C.). The heating step may be conducted for a time sufficient to kill microbes. The heating step may be conducted for about 1 to about 5 minutes or longer under a steam pressure of about 35 lbs/in$^t$ (102 kg/cm$^2$) to about 120 lbs/in$^2$ (351 kg/cm$^2$) or about 50 lbs/in$^2$ (146 kg/cm$^2$) to about 100 lbs/in$^2$ (293 kg/cm$^2$). For example, the heating step may be conducted at a temperature of about 300° F. (149° C.) for about 3 minutes at about 80 lbs/in$^2$ (234 kg/cm$^2$). Preferably, the heating step results in a substantially sterile growing medium. Some of the pigments and/or pigment precursors may impart its color to at least a portion of the wood components during the heating step. The steam flow rate during the heating step may be from about 4000 lbs/hour (1814 kg/hour) to about 15,000 lb/hour (6803 kg/hour). The pressurized vessel is operated at such temperatures and pressures that enable the pigments and/or pigments precursors in the bark, and optionally pigments and/or pigment precursors in the source of non-permanent dye, to impart its color to the wood fibers.

An example of a pressurized vessel and related process for step b) is disclosed in U.S. Pat. No. 2,757,150, which has been incorporated by reference, in which wood chips are fed to a pressurized steam vessel which softens the chips. Any type of wood chip may be used in this process, but wood chips of the softwood varieties such as yellow poplar, and particularly pine, are preferred.

The initial composition 14 is subsequently processed through a refiner 18 to form the mulch composition or growing medium 20. The refiner 18 may use a plurality of disks to obtain the mulch composition or growing medium 20. The refiner 18 may use two or more disks, one of which is rotating, to separate wood fibers from each other as set forth in U.S. Pat. No. 2,757,150, the entire disclosure of which is hereby incorporated by reference. The refiner 18 is generally operated at a lower temperature than the temperature in the pressurized vessel 16. The refiner 18 may be operated at a temperature in the range of about 70° F. (21° C.) to about 400° F. (204° C.), about 150° F. (150° C.) to about 350° F. (176° C.), about 200° F. (93° C.) to about 300° F. (148° C.). The refiner 18 may be operated under steam. The refiner 18 may be operated at atmospheric pressure or elevated pressures such as pressures of about 50 lbs/in$^2$ (146 kg/cm$^2$) or lower to about 100 lbs/in$^2$ (293 kg/cm$^2$). The refiner is operated at such temperatures and pressures that enable the pigments and/or pigments precursors in the bark, and optionally pigments and/or pigment precursors in the source of non-permanent dye, to impart its color to the wood fibers. Step b) is conducted for a time sufficient to impart darker color of the bark and/or the color of the non-permanent dye to the fibers. The refiner 18 produces fibers that are thinner than those that would be obtained without such processing.

In step c), the mulch composition or growing medium 20 is further refined. Moreover, it is at this stage that the additional components 22 such as fertilizers, as set forth above, are preferably added.

The dyed fiber produced by the method described above and the resulting mulch or growing medium composition have a light-fastness, in order of increasing preference, of at least up to 1 day, 5 days, 10 days, 20 days, 1 month, 2 months, or 3 months or more, with minimal fading, measured according to ASTM D4303-99. The term "minimal fading" refers to any visually discernable extent of fading. The light-fastness of the dyed mulch or growing medium may be about 1 to 120 days, about 5 to 90 days, about 10 to 30 days.

The mulch or growing medium may be used as a stand-alone mulch or growing medium. Alternatively, the mulch or growing medium may be added to a conventional mulch or growing medium to replace at least partially one or more components. The mulch or growing medium may displace peat, composted pine bark, perlite, vermiculite, sand, rock wool, compost, animal manure, rice hulls, hardwood bark, softwood bark, coir, other organic materials such as composted organic matter, the like, or a combination thereof. The growing medium may displace, in order of increasing preference, about 0.5% or more, 1% or more, 5% or more, 10% or more, 15% or more, 20% or more, 25% or more, 30% or more, 40% or more, 45% or more, 50% or more, 60% or more, 70% or more, 80% or more, 90% or more, 95% or more, or 99% or more of at least one of the components named above in a growing mix, based on the total weight of the growing mix. The growing medium may replace about 1 to about 99 weight %, about 20 to about 80 weight %, or about 40 to 60 weight % of one or more components in the conventional mulch or growing medium, based on the total weight of the mulch or growing medium. An exemplary conventional growing mix may contain, based on the total weight of the growing mix, about 80 weight % of peat and 20 weight % of perlite, which is being added to create air space for the peat. The mulch or growing medium of the present invention may replace the perlite entirely and replace at least about 50 weight % of the peat. The resulting mulch or growing medium may be thus environmentally advantageous as it contains only a relatively low amount of peat and more economical than the conventional growing mix due to replacement of perlite. The resulting growing medium may also provide a better balance of air and water retention than the peat-perlite and other conventional growing mixes.

Balanced air (non-capillary) and water (capillary) holding capacity provides ideal growing conditions to plants. The volume of air space is important for root systems and plants in general, as without oxygen, roots cannot grow and absorb water or minerals. The more oxygenated the roots are, the more efficient the plants become in converting sugars into energy for plant growing. Likewise, sufficient water retention of the mulch or growing medium is important to ensure that the roots have access to proper amount of water for photosynthesis, root growth, and efficient uptake of water by the growing plant without being oversaturated. Yet, the conventional growing mixes usually do not achieve balanced air and water retention as typically, when the volume % of water retention rises, it is at the expense of air retention and vice versa.

The mulch or growing medium of the present invention advantageously can provide balanced air and water holding capacity at about 25-60 volume % each, preferably between about 43-56 volume % each, more preferably about 48-49 volume % each, based on the total volume of the growing medium, measured in a container having dimensions 30.5× 30.5×30.5 cm (12 inches×12 inches×12 inches). The air and water holding capacity may each be without limitation, about 20 volume % or more, 25 volume % or more, 30 volume % or more, 35 volume % or more, 40 volume % or more, 45 volume % or more, 50 volume % or more, 55 volume % or more, 60 volume % or more, or 65 volume % or more, of the total volume of the mulch or growing medium, when measured in 30.5×30.5×30.5 cm (12 inches× 12 inches×12 inches) container.

Water and air holding capacity, as referred to herein, are measured according to "Procedures for Determining Physical Properties of Horticultural Substrates Using the NCSU Porometer by Horticultural Substrates Laboratory," Department of Horticultural Science, North Carolina State University in Raleigh, N.C., which is incorporated in its entirety by reference herein. The water holding capacity is measured by a Container Capacity test which measures the percent volume of a substrate that is filled with water after the mulch or growing medium is saturated and allowed to drain. It is the maximum amount of water the mulch or growing medium can hold. The drainage is influenced by the height of the substrate, this property is thus dependent on container size. The taller the container, the more drainage it will cause, and the less capacity of the substrate to hold water. The oxygen holding capacity is measured as percent volume of a substrate that is filled with air after the mulch or growing medium is saturated and allowed to drain. It is the minimum amount of air the material will have. It is affected by the container height in reverse fashion to container capacity; i.e., the taller the container, the more drainage and therefore more air space.

The sum of water and air holding capacity equal total porosity for a given density and moisture content. Total porosity defines the total volume of pores and refers to percent volume of a substrate that is comprised of pores, or holes. It is the volume fraction which provides the water and aeration in a substrate. The total porosity+the percent solids=100%. Total porosity of the mulch or growing medium may be about 88 to about 99 volume %, about 91 to about 98 volume %, about 93 to about 97 volume %, about 94 to about 96 volume %. Total porosity of the mulch or growing medium may be about 88 vol. % or more, 91 vol. % or more, 93 vol. % or more, 95 vol. % or more, 97 vol. % or more, 99 vol. % or more.

The water holding capacity (WHC) of the mulch or growing medium may be also measured by ASTM D7367-14, a standard test method for determining water holding capacity of fiber mulches for hydraulic planting. According to ASTM D7367-14, the water holding capacity (WHC) of the mulch or growing medium may be about 400 to about 1000 weight %, about 500 to 1000 weight %, about 600 to 900 weight %, based on the total weight of the mulch or growing medium.

An additional advantage of the mulch or growing medium of the present invention is lower dry bulk density as well as wet bulk density when compared to prior art substrates. High density may impose transportation limits on the growing substrates as such substrates may reach their weight limit before they reach the volume limit feasible for transportation. When compared to higher density media, the lower wet and dry bulk densities of the present mulch or growing medium provide greater volume of the mulch or growing medium to the end user at the same weight. The low density mulch or growing medium of the present invention may be added as a component to prior art media and thus lower their transportation costs by about 5% or more, 10% or more, 15% or more, or 20% or more, as compared to the prior art media alone. Additionally, a consumer may find it easier to purchase and utilize the mulch or growing medium of the present invention because of its lower weight. The dry bulk density of the mulch or growing medium may be, in order of increasing preference, about 6 lb/ft$^3$ or less, 4 lb/ft$^3$ or less, 3 lb/ft$^3$ or less, or 2 lb/ft$^3$ or less. The dry bulk density of the mulch or growing medium may be about 1.5 lb/ft$^3$ to about 6 lb/ft$^3$, about 2 lb/ft$^3$ to about 4 lb/ft$^3$, about 2.2 lb/ft$^3$ to about 2.6 lb/ft$^3$. The wet bulk density of the mulch or growing medium may be, in order of increasing preference, about 15 lb/ft$^3$ or less, 10 lb/ft$^3$ or less, 8 lb/ft$^3$ or less, 6 lb/ft$^3$ or less, 4 lb/ft$^3$ or less, 3 lb/ft$^3$ or less, or 2 lb/ft$^3$ or less. The wet bulk density of the mulch or growing medium may be about 2 lb/ft$^3$ to about 10 lb/ft$^3$, about 2.2 lb/ft$^3$ to about 5 lb/ft$^3$, about 2.4 lb/ft$^3$ to about 3 lb/ft$^3$.

Table 1 below illustrates test results for one embodiment of a mulch/growing medium comprising about 80% wood components and about 20% tree bark and another embodiment comprising 100% pine wood fiber, based on the total weight of the mulch or growing medium, in comparison to prior art growing media.

TABLE 1

Mulch/growing media properties

| Mulch/growing medium | Volume of air space [vol. %] | Volume of air space-range [vol. %] | Dry bulk density [lb/ft$^3$] | Dry bulk density [kg/m$^3$] | Wet bulk density [lb/ft$^3$] | Wet bulk density [kg/m$^3$] | Moisture content [%] |
|---|---|---|---|---|---|---|---|
| Mulch/growing medium of present invention (80% wood, 20% bark) | 30.25 | 25-75 | 2.37 | 37.96 | 2.83 | 45.33 | 90.99 |
| Mulch/growing medium of present invention (100% pine wood fiber) | 44.53 | 25-75 | 2.20 | 35.24 | 2.49 | 39.89 | 89.80 |
| Sphagnum Peat | 10.22 | 5-25 | 4.25 | 68.08 | 12.04 | 192.86 | 85.78 |
| 3/8" Hammermilled Bark | 24.00 | 20-45 | 9.64 | 154.42 | 23.82 | 381.56 | 75.99 |
| Retruder Processed Bark | 14.69 | — | 7.46 | 119.50 | 19.85 | 317.49 | 84.56 |
| Coir Block Fiber | 15.36 | — | 4.42 | 70.80 | 32.55 | 521.40 | 89.33 |

The data in Table 1 was collected by JR Peters Laboratory Allentown, Pa., USA, using "Procedures for Determining Physical Properties of Horticultural Substrates Using the NCSU Porometer by Horticultural Substrates Laboratory," Department of Horticultural Science, North Carolina State University in Raleigh, N.C., which is incorporated in its entirety by reference herein.

The percent volume of air space in Table 1 refers to the air holding capacity discussed above which was measured as the percent volume of a substrate that is filled with air after the material is saturated and allowed to drain. It is the minimum amount of air the material will have. The measuring container had the following dimensions: 30.5×30.5× 30.5 cm (12 inches×12 inches×12 inches).

The bulk density in Table 1 refers to the ratio of the mass of dry solids to the bulk volume of the substrate. The bulk volume includes the volume of solids and pore space. The mass is determined after drying to constant weight at 221° F. (105° C.), and volume is that of the sample in cylinders.

The moisture content in Table 1 refers to the percent moisture found in a sample on a wet mass basis. This is calculated by: [(Wet weight−Dry weight)/Wet weight]×100. It denotes how much of a particular sample is comprised of water.

Table 2 provides comparison of prior art growing media with two embodiments of the present invention, specifically one embodiment of a mulch or growing medium comprising about 80% wood components and about 20% tree bark and another embodiment comprising 100% pine wood fiber, based on the total weight of the mulch or growing medium. The loose bulk density data in Table 2 was gained by packing the mulch or growing medium into a container measuring 30.5×30.5×30.5 cm (12 inches×12 inches×12 inches) after the mulch or growing medium was expanded by an opener and/or by using a process recommended for the specific kind of a mulch or growing medium.

TABLE 2

Loose bulk density

| Mulch/growing medium | Expanded bulk density including moisture content of the mulch/growing medium | | Net dry weight expanded bulk density | |
|---|---|---|---|---|
| | [lb/ft³] | [kg/m³] | [lb/ft³] | [kg/m³] |
| Mulch/growing medium of present invention (80% wood, 20% bark) | 1.2-1.75 | 19.22-28.03 | 0.9-1.35 | 14.42-21.62 |
| Mulch/growing medium of present invention (100% pine wood fiber) | 1.0-1.65 | 16.02-26.43 | 0.75-1.25 | 12.01-20.02 |
| Sphagnum Peat | 9.0-12.5 | 144.17-200.23 | 5.0-6.85 | 80.09-109.73 |
| ⅜" Hammermilled Composted Pine Bark | 23-33 | 368.43-528.61 | 11.0-17.5 | 176.20-280.32 |
| ⅜" Hammermilled Aged Pine Bark | 15-20 | 240.28-320.37 | 7.5-10 | 120.14-160.19 |

Table 3 provides a size classification of the fiber of the mulch or growing media; the weight % of material passing through various sieve sizes as well as density, WHC, and total porosity are also provided. Total porosity was measured by the porometer testing "Procedures for Determining Physical Properties of Horticultural Substrates Using the NCSU Porometer by Horticultural Substrates Laboratory," as referenced above.

TABLE 3

Wood fiber size classification

| Materials: wt. % wood components/ wt. % bark | | 90%/ 10% | 70%/ 30% | 50%/ 50% | 30%/ 70% | 10%/ 90% | ranges |
|---|---|---|---|---|---|---|---|
| Sieves Mesh/ μm | #8/2380 [wt. %] | 15.9 | 26.7 | 21.0 | 8.6 | 4.7 | 4-25 |
| | #16/1180 [wt. %] | 23.8 | 16.3 | 9.6 | 10.1 | 8.9 | 9-30 |
| | #25/710 [wt. %] | 25.0 | 14.9 | 12.5 | 13.7 | 10.1 | 15-35 |
| | #50/300 [wt. %] | 20.7 | 17.6 | 25.6 | 27.0 | 25.4 | 15-30 |
| | #100/150 [wt. %] | 10.0 | 13.5 | 15.4 | 21.1 | 20.4 | 6-15 |
| | pan/<150 [wt. %] | 4.6 | 11.0 | 15.9 | 19.5 | 26.4 | 2-20 |
| Total porosity | Porometer [vol. %] | 96-99 | 94-98 | 93-97 | 91-95 | 88-94 | 88-99 |
| Density | Range [lb/ft³]; [kg/m³] | 1.5-2.0; 24-32 | 1.5-2.5; 32-40 | 2.0-3.25; 40-52 | 3.0-5.0; 48-80 | 3.5-6.5; 56-104 | 1.5-6.5; 24-104 |
| WHC | ASTM D7367-14 [wt. %] | 825-925 | 725-825 | 625-725 | 500-625 | 400-500 | — |

The sieve size of the fiber particles in the end product may range from US sieve size #8 to #100, but other sieve sizes are contemplated. The size of the fiber in the mulch or growing medium may range from about 0.149 mm to about 2.38. Some of the wood components and/or bark may be processed in such a way that they become a powder with a particle size of about 30 μm or smaller to about 600 μm or larger. Generally, the smaller the fiber size, the higher the WHC.

In the Table 3 above, 79.5% of the wood/bark fiber components of the composition having 90 wt. % wood components and 10 wt. % bark, has a particle size smaller than 2036 μm and larger than 150 μm. 62.3% of the wood/bark fiber components of the composition having 70 wt. % wood components and 30 wt. % bark has a particle size smaller than 2036 μm and larger than 150 μm. 63.1% of the wood/bark fiber components of the composition having 50 wt. % wood components and 50 wt. % bark has a particle size smaller than 2036 μm and larger than 150 μm. 71.9% of the wood/bark fiber components of the composition having 30 wt. % wood components and 70 wt. % bark has a particle size smaller than 2036 μm and larger than 150 μm. 64.8% of the wood/bark fiber components of the composition having 10 wt. % wood components and 90 wt. % bark has a particle size smaller than 2036 μm and larger than 150 μm.

The mulch composition or growing medium may be also used in hydraulic applications. The hydraulically-applied mulch or growing medium presents an effective solution for restoration of vegetation and erosion control. The hydraulically-applied mulch or growing medium may bond directly to soil while protecting seed, thus sheltering seedlings and/or plants from wind, heavy rains, and other environmental conditions while allowing seed germination and plant growth. The hydraulically-applied mulch or growing medium may be used to secure statically-compromised slopes, stabilize highly erodible soil, reintroduce native species of plants, the like, or a combination thereof. The hydraulically-applied mulch or growing medium may be used alone or in combination with other erosion-control methods. The hydraulically-applied mulch or growing medium may be used during highway projects, recreational projects such as golf courses, in mine reclamation areas, in industrial or other applications.

The hydraulically-applied mulch or growing medium may be applied to a site at once or in a plurality of stages. The mulch composition or growing medium may be mixed together with water, and optionally seed, chemical binders, natural gums, and/or interlocking manmade fibers, and/or other components in a tank of a hydro-spraying machine or another suitable equipment. The seed may contain one species or comprise a mix of species such as native or non-native grasses, wildflowers, forbs, or other desirable species. The mixing may continue until fiber of the mulch or the growing medium is substantially broken apart and hydrated. When proper viscosity and activation of bonding additives is achieved, additional components named above or other components such as fertilizers, nutrients, and/or micronutrients, may be added. The hydrated mulch or growing medium may be then applied onto the site from a suitable equipment such as a hydro-spraying machine with a fan-type nozzle. Immediately after application, the mulch or the growing medium bonds directly to the soil and provides protection for dormant seed, minimizes soil loss, and assists in fast establishment of vegetation at the application site. The natural coloring and/or natural non-permanent dye may assist in visual metering of the hydraulically applied mulch or growing medium during and after its application. Therefore, a color of the dyed much or growing medium which differs from the surface color at the application site for at least certain amount of time may be prepared by the process described above. Alternatively, a mulch or growing medium having the same color as the surface may be prepared.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A naturally-dyed mulch or growing medium composition comprising:
    about 5 to 95 weight % fibrous tree bark, based on the total weight of the mulch or growing medium composition, the bark comprising natural pigments;
    about 5 to 95 weight % fibrous wood components, based on the total weight of the mulch or growing medium composition; and
    less than about 15 weight % additional components comprising one or more of natural binder(s), naturally occurring gums, water absorption enhancement component(s), organic acid(s), manmade interlocking fiber(s), fertilizer(s),
    the naturally-dyed mulch or growing medium composition having a dry bulk density of about 6 lb/ft$^3$ or lower and hsl coordinates such that h is from about 25-45, s is from about 20-100, and 1 is less than about 50,
    wherein the composition has light-fastness of at least 1 day, measured according to ASTM D4303-99.

2. The dyed mulch or growing medium composition of claim 1, wherein the composition includes about 50 to 95 weight % fibrous tree bark and about 5 to 50 weight % fibrous wood components.

3. The dyed mulch or growing medium composition of claim 1, wherein one or more of the additional components are present in an amount between about 1 and 15 wt. %.

4. The dyed mulch or growing medium composition of claim 1, wherein the composition has water holding capacity of about 400-1000 weight %, based on the total weight of the composition, measured by ASTM D7367-14.

5. The dyed mulch or growing medium composition of claim 1, wherein the bark includes bark from pine, oak, walnut (*Juglans cinerea*), mahogany (*Swietenia macrophylla, Swietenia mahagoni, Swietenia humilis*), hemlock, Douglas fir, Colorado fir, alder, elm, birch, Sitka spruce, eucalyptus, sycamore, maple, cedar, sweetgum, crab apple, ash, weeping willow, sassafras, mulberry, or a combination thereof.

6. The dyed mulch or growing medium composition of claim 1, wherein the fibrous wood components include poplar, pine, or both.

7. The dyed mulch or growing medium composition of claim 1, wherein the composition further comprises at least one of macronutrient(s), micronutrient(s), mineral(s), or seed.

8. The dyed mulch or growing medium composition of claim 1 further comprising composted pine bark, vermiculite, sand, rock wool, compost, animal manure, rice hulls, hardwood bark, softwood bark, peat, or a combination thereof.

9. The naturally-dyed mulch or growing medium composition of claim 8 further comprising a non-permanent dye.

10. A dyed mulch or growing medium composition comprising:
    at least about 50 weight % fibrous wood components, based on the total weight of the mulch or growing medium composition;
    a non-permanent dye; and
    at least one additional component comprising natural binder(s), guar gum, water absorption enhancement component(s), manmade interlocking fiber(s), or a combination thereof,
    the dyed mulch or growing medium composition having a dry bulk density of about 6 lb/ft$^3$ or lower and a color with a dominant wavelength from about 400 nm to about 780 nm relative to a white illuminate,
    wherein the composition has light-fastness of at least 1 day, measured according to ASTM D4303-99.

11. The dyed mulch or growing medium composition of claim 10, wherein the composition includes 100 weight % fibrous wood components.

12. The dyed mulch or growing medium composition of claim 10, wherein the composition is substantially bark free.

13. The dyed mulch or growing medium composition of claim 10, wherein the non-permanent dye includes one or more synthetic compounds.

14. The dyed mulch or growing medium composition of claim 10, wherein the fibrous wood components include softwood varieties.

15. The dyed mulch or growing medium composition of claim 10, wherein the composition further comprises at least one of macronutrient(s), micronutrient(s), mineral(s), or seed.

16. The dyed mulch or growing medium composition of claim 10 further comprising composted pine bark, vermiculite, sand, rock wool, compost, animal manure, rice hulls, hardwood bark, softwood bark, peat, or a combination thereof.

17. The dyed mulch or growing medium composition of claim 10, wherein the non-permanent dye comprises a naturally derived non-permanent dye.

18. The dyed mulch or growing medium composition of claim 10, wherein the non-permanent dye is non-toxic.

19. A naturally-dyed mulch or growing medium composition comprising:
- about 1 to 50 weight % fibrous tree bark, based on the total weight of the mulch or growing medium composition;
- about 50 to 99 weight % fibrous wood components, based on the total weight of the mulch or growing medium composition; and
- less than about 15 weight % additional components comprising natural binder(s), naturally occurring gums, water absorption enhancement component(s), organic acid(s), manmade interlocking fiber(s), fertilizer(s),
- the naturally-dyed mulch or growing medium composition having a dry bulk density of about 6 lb/ft$^3$ or lower and the composition having hsl coordinates of h having a value from about 25-45, s having a value from about 20-100, and 1 having a value of less than about 50,
- wherein the composition has light-fastness of at least 1 day, measured according to ASTM D4303-99.

20. The naturally-dyed mulch or growing medium composition of claim 19, wherein the composition is artificial dye-free.

* * * * *